United States Patent [19]

Swinbanks

[11] 4,044,203
[45] Aug. 23, 1977

[54] ACTIVE CONTROL OF SOUND WAVES

[75] Inventor: Malcolm Alexander Swinbanks, Glasgow, Scotland

[73] Assignee: National Research Development Corporation, London, England

[21] Appl. No.: 607,462

[22] Filed: Aug. 25, 1975

Related U.S. Application Data

[63] Continuation of Ser. No. 417,636, Nov. 28, 1973, abandoned.

[30] Foreign Application Priority Data

Nov. 24, 1972 United Kingdom ............... 54370/72

[51] Int. Cl.[2] .................. E04B 1/99; G10K 11/04
[52] U.S. Cl. ................... 179/1 P; 181/33 L; 181/33 H
[58] Field of Search ............. 179/1 P, 1 DM; 181/33 L, 33 H, 33 HA, 33 HB

[56] References Cited

U.S. PATENT DOCUMENTS

| 2,043,416 | 6/1936 | Lueg | 179/1 P |
|---|---|---|---|
| 3,693,749 | 9/1972 | Motsinger et al. | 181/33 L |
| 3,826,870 | 7/1974 | Wurm et al. | 179/1 P |
| 3,936,606 | 2/1976 | Wanke | 181/33 L |

FOREIGN PATENT DOCUMENTS

| 1,190,317 | 3/1959 | France | 181/33 L |
|---|---|---|---|
| 1,357,330 | 6/1974 | United Kingdom | 181/33 L |

Primary Examiner—Douglas W. Olms
Attorney, Agent, or Firm—Cushman, Darby & Cushman

[57] ABSTRACT

A sound wave propagated along a duct through a fluid contained in the duct is attenuated by generating sound waves from an array of sound sources spaced along the duct. Each source generates two waves travelling in opposite directions; those travelling in the same direction as the unwanted wave sum to give a resultant which interferes destructively with the unwanted wave, while those travelling in the opposite direction sum to give a negligible resultant. The source array may be operated in response to detection of the unwanted wave.

10 Claims, 15 Drawing Figures

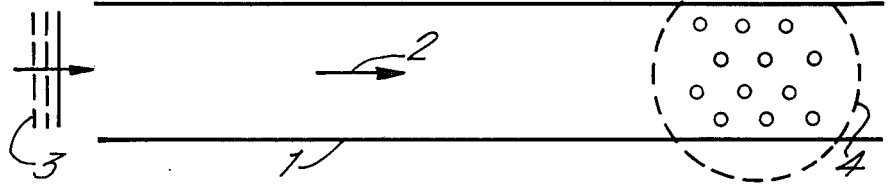
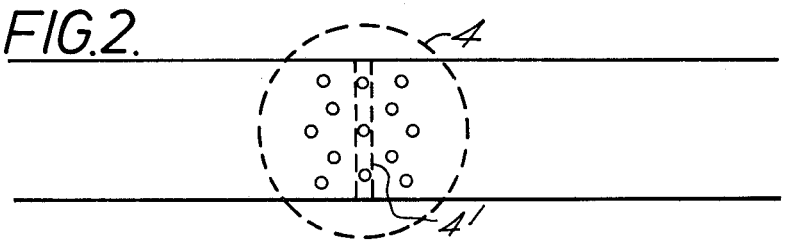
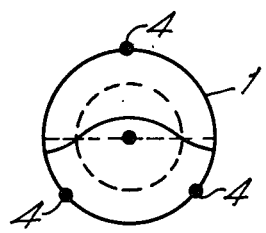
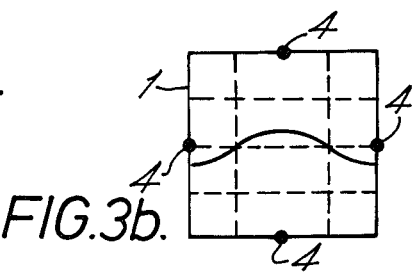
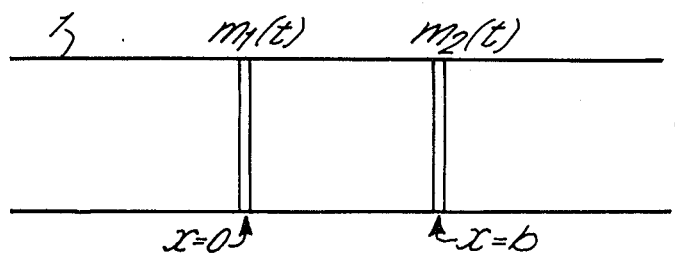
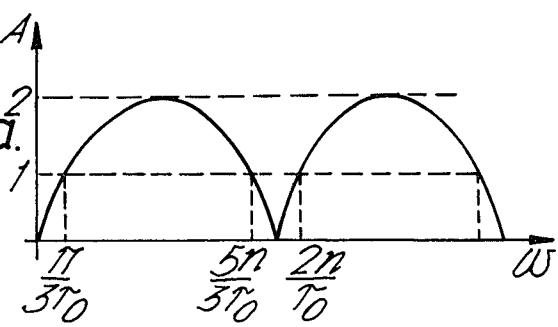

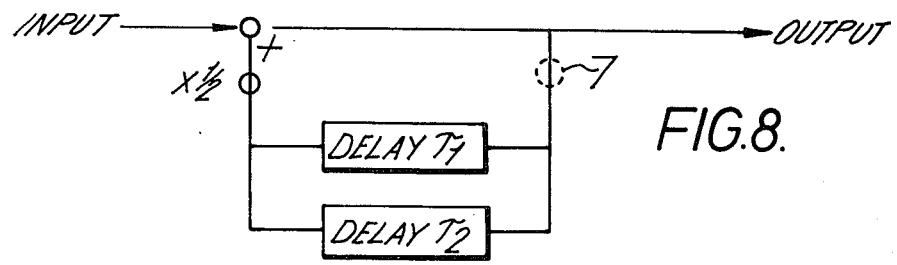
FIG. 8.
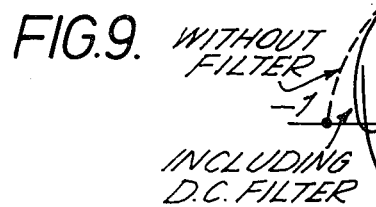
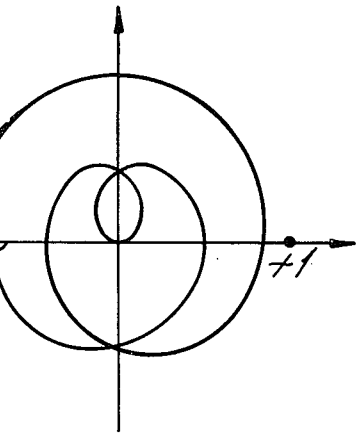
FIG. 9.
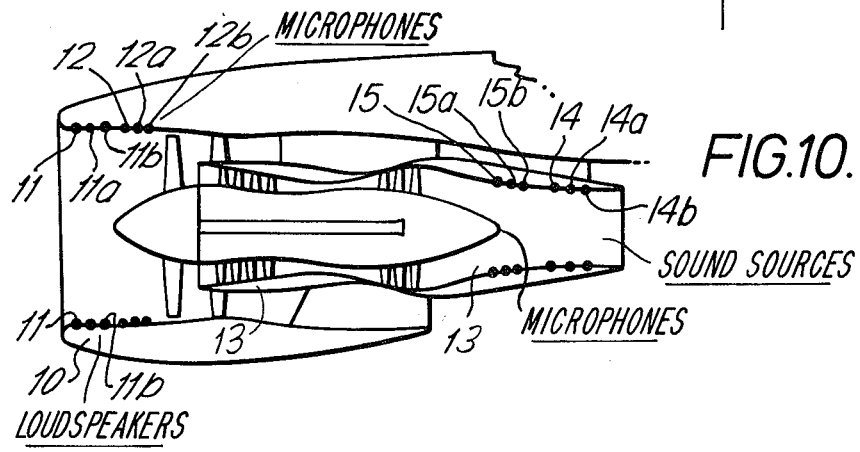
FIG. 10.
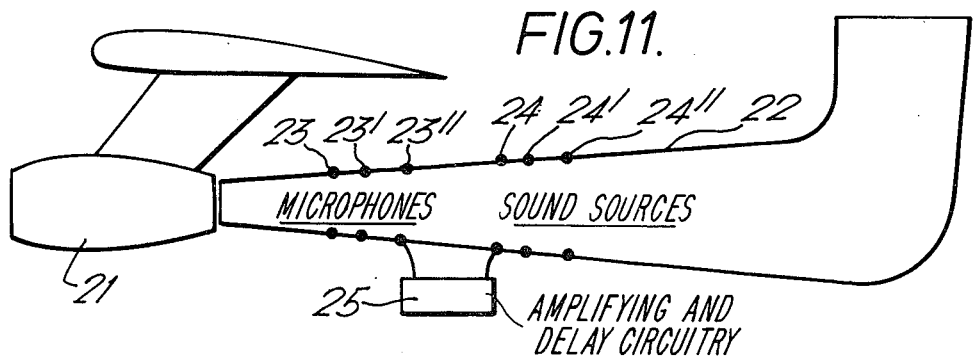
FIG. 11.

ACTIVE CONTROL OF SOUND WAVES

This is a continuation of application Ser. No. 417,636 filed Nov. 20, 1973, now abandoned.

This invention relates to a method of attenuating a given sound field by means of a radiation pattern which interferes with and reduces the effect of the original field. Up till now, most attempts to achieve a reduction in noise level have been confined either to reducing the efficiency of the source generating the sound or to passive methods of control, e.g. by lagging with absorbing material or by deliberate impedance mismatching to prevent efficient transmission of the sound.

A method of generating sound waves which interfere destructively with the sound field to be attenuated was described by Jessel and Mangiante in the "Journal of Sound and Vibration" 1972 in a paper under the file "Active Sound Absorbers in an Air Duct". However the method described is inefficient and the reasons for this inefficiency are fully described later in this specification.

The invention provides a method of attenuating a sound wave propagating in a given direction along a duct through a fluid contained in the duct, the method comprising: generating sound waves from an array of similar sound sources located adjacent the wall of said duct respectively at different positions along said duct, each source generating a pair of sound waves which travel through said fluid in opposite directions along said duct from the position of that source; and controlling the operation of said array of sources to cause destructive interference to occur between the wave to be attenuated and the resultant of the waves generated by said sources and travelling in said given direction and simultaneously to cause the resultant of the waves generated by said sources and travelling in the direction opposite to said given direction to be negligible.

It is to be understood that the expression "sound" used in this specification implies no limitation on the frequency of a wave motion in relation to the physiological perception of sound.

Depending upon the precise circumstances of application, the generated sound waves can be related to the operation of the source of unwanted sound waves, or they can be generated in response to detection of the unwanted sound waves. Arrays of detectors similar in disposition to the arrays of sources provided by the invention may be used to eliminate unwanted coupling between sources and detectors. Advantageously, the degree of attenuation of the unwanted sound may be measured by suitable monitoring means, whose output controls the generated sound waves.

The invention is particularly well suited to the control of longitudinal propagation of sound waves or pressure pulses in ducts. As will be more fully explained below, for such an application it may be appropriate to use composite sound sources each comprising at least three discrete sound generating devices distributed symmetrically about the wall of the duct; thus where the duct is of circular cross-section, a suitable arrangement involves the use of three devices distributed symmetrically around the circumference and where the duct is of square cross-section a suitable arrangement involves the use of four devices respectively situated centrally in the four sides.

A further general point that may conveniently be mentioned here is that in the following description the terms "downstream" and "upstream" are used to refer respectively to the directions corresponding and opposite to the direction of propagation along the duct of the wave to be attenuated, and are not used with reference to any general flow of fluid along the duct, which may occur in either of these directions.

The invention will now be explained in greater detail with reference to the accompanying drawings, in which:

FIG. 1 is a diagram of a duct in which a plane wave of sound is propagating;

FIG. 2 shows part of the duct of FIG. 1;

FIGS. 3a and 3b illustrate propagating modes which can be excited in the duct of FIG. 1;

FIG. 4 shows diagrammatically an arrangement incorporating two ring sources in a duct;

FIG. 4a is an explanatory diagram relating to the arrangement of FIG. 4;

FIG. 8 shows a simple feedback circuit involving two time delays;

FIG. 9 is the Nyquist plot for a feedback loop of the kind shown in FIG. 8;

FIG. 10 is a diagrammatic axial section through a jet engine incorporating sound attenuating means in accordance with the present invention; and FIG. 11 is a diagrammatic axial section of a detuner for a jet engine and also incorporating sound attenuating means in accordance with the present invention.

Figure 5A:
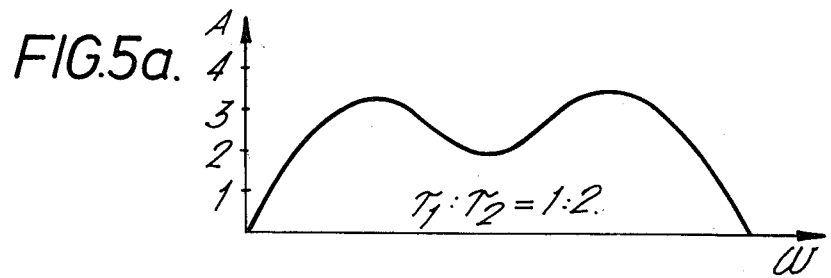
FIGS. 5a, 5b and 5c are further explanatory diagrams.

The case of plane waves will be treated in greatest detail below, since this is the simplest problem, and yet one which has a number of possible applications. However, the invention is not to be construed as being limited to this case.

The methods of the invention are applicable not only to problems where the frequencies are in the audible spectrum 20–20,000 Hertz, but also to higher or lower frequencies. In fact, the problem which originally fed to this invention was one of controlling very low frequency pressure fluctuations — of the order of 1 Hertz — in a large pipeline. This was to be used for extracting waste gas from a factory and ducting it over a comparatively long distance of 1.5 km. The pipe was to be of large diameter and relatively cheap construction with the result that it would be incapable of withstanding a large pressure reduction inside. A control system had to be devised to ensure that fluctuations in the gas pressure on entry to the pipeline were sufficiently small that collapse could not occur.

However, the possible application of active control would appear to be of much wider variety. For example, in the case of gas turbines used in turbofan aircraft, and being considered for use in automobiles and trains, the compressor is responsible for generating a considerable proportion of the noise, and this noise is mainly directed forward out of the front of the nacelle.

The basic problem in the plane wave case may be expressed as follows: a fluid is flowing steadily and uniformly down a long duct at Mach Number M, and a propagating plane sound wave is travelling through the fluid along the duct; the Mach Number M is taken to be positive or negative according to whether the direction of flow is the same as or opposite to the direction of propagation of the sound wave. The objective is to find a suitable distribution of point sources mounted in the duct walls, which will generate a plane wave interfering destructively with the incident plane wave and thus reducing its effect; in practical embodiments it is, of course, necessary to use sound generating devices having a finite size (such as loudspeakers) rather than true point sources, but this does not affect the principles involved in the following discussion. At the same time it must be ensured that no propagating transverse modes are excited, while retaining as much simplicity in the final arrangement as possible. FIG. 1 shows schematically the duct 1, the flow (arrow 2), the incident plane wave 3, and an array of point sources 4.

As stated this problem is somewhat open-ended, but it simplifies considerably and may be expressed more precisely once it is realised that the question of the generation of transverse modes can be eliminated from the discussion at an early stage, as follows.

Any given distribution of point sources mounted in the duct walls may be regarded as a superposition of composite sources, each obtained by considering a localised cross-section of the duct as illustrated in FIG. 2 and each incorporating a plurality of point sources distributed around the periphery of the relevant cross-section. Such composite sources are referred to hereinafter as "ring sources" regardless of whether or not the cross-section of the duct is circular. The contribution to the plane wave term made by a single ring source 4' depends only on its total source strength — not upon the way the point sources are distributed around the periphery of the cross-section.

But the distribution around the periphery does determine which of the higher modes are generated, and it can be shown that there is a certain frequency denoted by $\omega_\mu(M)$ above which a single ring source must excite propagating transverse modes — no matter how the circumferential peripheral distribution is chosen. This will be taken to represent a natural upper operating limit and it becomes apparent that to operate above this frequency it must either be accepted that transverse modes will be generated of the complexity of the overall source array must be considerably increased.

It turns out that for a circular duct, $\omega_{82}(M) = 2.1 \omega_c(M)$, where $\omega_c(M)$ is the fundamental cut-off frequency of the duct — i.e. that frequency below which no transverse modes can propagate. It is also found that a ring source incorporating a simple arrangement of three point sources symmetrically placed around the walls of the duct as shown in FIG. 3a will give results as good or better than those given by any other configuration, and such a source will not generate any transverse modes below $\omega_\mu(M)$.

The equivalent result for the square duct yields $\omega_\mu(M) = 2.8 \omega_c(M)$ and this can be achieved by using a ring source incorporating four point sources, one mounted at the centre of each side of the duct, as shown in FIG. 3b.

In each case the first propagating mode to be excited is a symmetric mode having a rise in pressure at the duct centre accompanied by a reduction in pressure at the walls — the mode $J_o(\lambda r)$ for the circular duct and the (2,2) mode, $$\cos \frac{2\pi y}{a} \cos \frac{2\pi z}{a},$$

for the square duct. Any other ring source is bound to generate either this mode or some mode having a lower cut-off frequency. The modes are sketched in FIGS. 3a and 3b.

So, providing the source array is made up from ring sources of the above type, each with three or four point sources as appropriate, and providing consideration is confined to frequencies below $\omega_\mu(M)$, only the total source strength $m(t)$ of each ring source and its corresponding contribution to the plane wave need be considered. This contribution, as a function $P(x,t)$ of time $t$ and distance $x$ along the duct from the source ($x$ being positive in the downstream direction and negative in the upstream direction), is given by $$p(x,t) = \frac{c_o}{2A} \cdot \frac{1}{(1+M)} m(t - \frac{x}{c_o(1+M)})$$

downstream $$p(x,t) = \frac{c_o}{2A} \cdot \frac{1}{(1-M)} m(t + \frac{x}{c_o(1-M)})$$

upstream where $A$ is the duct area of cross-section and $c_o$ is the velocity of propagation of sound through the fluid.

The exact values for $\omega_\mu(M)$ are:
$\omega_{82}(M) = 2.1\omega_c(M) = 3.8c_o(1-M^2)/R$ for a circular duct, radius 'R'
$\omega_\mu(M) = 2.8\omega_c(M) = 2.8\pi c_o(1-M^2)/a$ for a square duct of side $a$. For a circular duct 1 meter diameter, with a flow Mach Number 0.5 and $c_o = 320$ m/sec, then $$f_u(M) = \frac{1}{2\pi} \omega_u(M) = 300 \text{ Hz}$$

So now the problem is to find a combination of ring sources that will generate a plane wave to interfere with the incident wave on the downstream side of the sources.

At first sight it might appear that the required result could be obtained by using a single ring source, and arranging for the downstream output to be equal and opposite to the incident plane wave, thus producing zero disturbance downstream. But this would not be very satisfactory as an equivalent upstream-directed output would be generated, and the system would not absorb or attenuate the field in any way but would simply reflect it. Moreover, if there were any upstream obstruction which subsequently reflected this output back again it would be necessary to control both the incident wave and the reflected wave.

It is therefore necessary to find a configuration which will not re-radiate the sound upstream, and this is equivalent to finding a combination of ring sources which in the absence of an incident wave is capable of producing an output in the downstream direction only.

It is possible to produce this effect by taking two ring sources $m_1(t)$ and $m_2(t)$ say at $x = 0$ and $x = b$ respectively as shown in FIG. 4, and arranging that
$m_1(t) = -m_2(t-\gamma_{21})$, where $\gamma_{21}$ is the time taken for a signal to travel upstream from $m_2$ to $m_1$. The total output upstream is zero, but the residual output downstream is $$\frac{c_o}{2A} \frac{1}{(1+M)} \{m_2(t - \frac{x-b}{c_o(1+M)}) - m_2(t - \frac{x-b}{c_o(1+M)} - \gamma_o)\}$$

where $\gamma_o = 2b/c_o(1 - M^2)$ (the time taken for a signal to pass from $m_1$ to $m_2$ and then back again).

In general this is non-zero — in fact if $m_1$ and $m_2$ have sinusoidal outputs of amplitude $m_o$ and frequency $\omega$, the output downstream has amplitude $$\frac{c_o}{A} \frac{m_o}{(1+M)} \left|\sin \frac{\omega \gamma_o}{2}\right|$$

Now a single source of amplitude $m_o$ operating alone in the fluid would produce a downstream output $$\frac{c_o}{A} \frac{m_o}{2(1+M)}$$

and this serves as a means of comparison. The useful frequency range of the source doublet would be expected to be that range over which the output is greater than or equal to the output of an isolated source. This occurs over the frequency ranges $$\frac{2n\pi}{\gamma_o} + \frac{\pi}{3\gamma_o} \leq \omega \leq \frac{2n\pi}{\gamma_o} + \frac{5\pi}{3\gamma_o}$$

where $n$ has the values 0, 1, 2, etc. The fundamental interval gives a frequency range of X5 or 2⅓ octaves, and the maximum output in this band occurs when the source separation is ¼ wavelength times $(1-M)$. This is shown in the graph of FIG. 4a in which the output amplitude A of the two source doublet, relative to that of a single source, is plotted against frequency $\omega$.

Now consider the effect of introducing an extra source $m_3(t)$ at $x = d$, $d > b$ to see how this frequency range can be improved. Since there is only one equation to satisfy, namely that the upstream output is zero, there is complete freedom in the choice of one of the sources, say $m_3(t)$. But this effectively comprises the superposition of two source pairs, one formed by $m_1(t)$ and $m_2(t)$ and the other by $m_1(t)$ and $m_3(m_3(t))$. It is found that a "natural" choice $$m_3(t) = m_2(t - \frac{d-b}{c_o(1+M)})$$

may be made, corresponding to arranging that the downstream outputs of the two source doublets reinforce one another. (Incidentally, there are two other natural choices corresponding to a regrouping of the source pairs, but it is unnecessary to consider these further since the same effect could be obtained by taking $d$ or $b$ negative.)

With this choice, he downstream output at $x = d$ is $$\frac{c_o}{A} \frac{1}{(1+M)} \{m_2(t - \frac{d-b}{c_o(1+M)}) - \frac{1}{2}\{m_2(t - \frac{d-b}{c_o(1+M)} - \gamma_1) + m_2(t - \frac{d-b}{c_o(1+M)} - \gamma_2)\}\}$$

where $$\gamma_1 = \frac{2b}{c_o(1-M^2)}, \gamma_2 = \frac{2d}{c_o(1-M^2)}$$

For a given frequency $'\omega$, and an amplitude $m_o$ for the source $m_2$ the amplitude of this output is $$\{\frac{c_o}{A} \frac{m_o}{2(1+M)}\} 2 \left|1 - \frac{1}{2}(e^{-i\omega\gamma_1} + e^{-i\omega\gamma_2})\right|$$

Figure 5B:
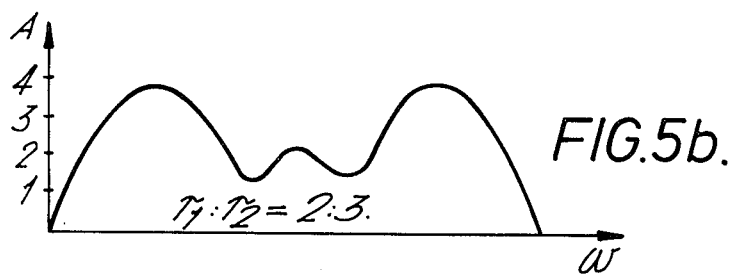
Figure 5C:
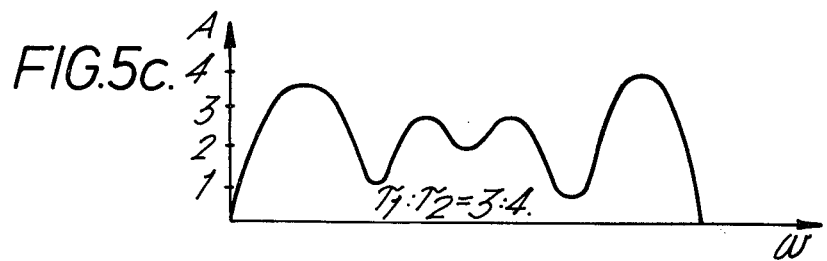

X downstream Output of single source of amplitude $m_o$. By plotting the function
$$|1 - \frac{1}{2}(e^{-i\omega\gamma_1} + e^{-i\omega\gamma_2})|$$

for various values of $\gamma_1 : \gamma_2$ as shown in FIGS. 5a, 5b and 5c it is found that the ratio 2:3 shown in FIG. 5b represents a sensible choice, giving a useful frequency range of X20 or 4⅓ octaves. This should be adequate for most purposes. On an octave scale, the mid-band frequency occurs for $d$, the overall separation, equal to 0.34 $(1 - M) \times$ wavelength. For two sources, again on an octave scale, the mid-band frequency occurs when the source separation is only 0.19 $(1 - M) \times$ wavelength. Thus by using three sources an increase in frequency range is obtained at the expense of a corresponding increase in the overall length of the array.

It should be noted that one could also obtain a unidirectional plane wave output by suitably superposing a single source and a dipole source, the latter consisting of two equal but opposite sources positioned very close together. This is the arrangement described by Jessel and Mangiante in the paper mentioned previously. But under these circumstances, where the overall source separation is very small compared to the wavelength of the emitted sound, the efficiency of the unidirectional generator is very low — this arrangement would be directly equivalent to operating in the region $\omega \sim 0$ the curve 4a. On the other hand, by separating the sources longitudinally along the axis of the duct it is possible to achieve a considerably greater output — in fact the maximum output occurs when the separation is ¼ wavelength $\times (1 - M)$, where M is the Mach Number of the flow in the duct. This in turn means that when one uses the output to interfere with and hence to absorb an incident disturbance wave, one would achieve the maximum possible capacity for absorption by choosing a separation of ¼ wavelength $\times (1 - M)$. In comparison, an absorber constructed from a monopole-dipole combination would be extremely inefficient.

It has been shown that by using a combination of two or three ring sources, each consisting in appropriate cases of three or four point sources, a unidirectional plane wave downstream output can be generated. To control a disturbance plane wave it is simply necessary to arrange that this output interferes with and nullifies the disturbance.

Let the initial disturbance wave be described by $$f_o(t - \frac{x}{c_o(1+M)})$$

Then for two ring sources the equation which it is required to satisfy is $$f_o(t - \frac{x}{c_o(1+M)}) +$$

-continued
$$\frac{c_o}{2A} \frac{1}{(1+M)} [m_2(t - \frac{X-b}{c_o(1+M)}) -$$
$$m_2(t - \frac{X-b}{c_o(1+M)} - \gamma_o)] = 0$$

i.e.

$$\frac{c_o}{2A} \frac{1}{(1+M)} \{m_2(t) - m_2(t - \gamma_o)\} =$$
$$-f_o(t - \frac{b}{c_o(1+M)})$$

The equivalent relation for three sources is $$\frac{c_o}{A} \frac{1}{(1+M)} \{m_2(t) -$$
$$\frac{1}{2} [m_2(t - \gamma_1) + m_2(t - \gamma_2)]\} =$$
$$-f_o(t - \frac{b}{c_o(1+M)})$$

If the appropriate equation can be satisfied, this will achieve the object of having no downstream disturbance, while upstream of the sources the only disturbance will be the incident wave.

Now it is clear that it is not possible to satisfy these equations for all frequencies, and if the amplitudes of motion of the sources are not to become excessive one will be confiled to the "useful" frequency ranges already discussed.

But before discussing the design of a practical control system which would detect the disturbance wave and operate the sources in a suitable manner, it will be assumed that consideration is confined to frequencies for which the equations can be satisfied in order to discuss the way in which the sources absorb the incident energy.

Figure 6:
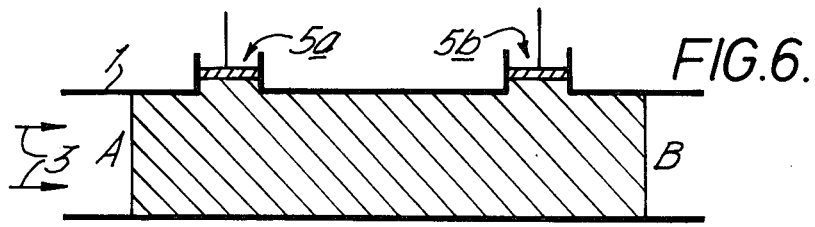
FIG. 6 is a diagram of a duct having a pair of longitudinally spaced pistons.

Consider the case illustrated in FIG. 6 where the sources consist of two pistons 5a and 5b mounted in the side of a duct, and in which, for simplicity, it will be assumed that the flow velocity is zero. Then for frequencies well below the cut-off frequency of the first transverse mode, the flow is essentially incompressible on a length scale comparable with the pipe diameter. Hence if b — the separation between the pistons measured along the pipe — is sufficiently small, the fluid in the region shown will behave approximately as an incompressible fluid.

The combined effect of the incident wave on the surface 'A' and the appropriate motion of thw two pistons is just such that the surface 'B' is not permitted to move. Then the work done by the incident wave is exactly equal to the work done on the pistons.

In practice the sources would be driven by some form of feedback amplifier and the excess energy would be absorbed in the output stage of the amplifier — in the same way that a feedback servo mechanism absorbs energy when the servo is moved so that the output force does work on the servo. The actual amounts of acoustic energy involved in any application would be very small and absorbing this should present no problem.

If the sources are loudspeaker cones, the energy would be radiated off the back of the cone into the space outside the duct. The outside of the source system could then be enclosed in a box well-lined with absorbent material and this would be equivalent to extracting the sound from the flow where there is only a limited time available for absorption, and diverting it into a static region where as much time is available as it takes to absorb it.

A more detailed analysis can be made, again for zero Mach Number, but no longer assuming locally incompressible flow. It can be shown that the work done by a source in the absence of convection is $$\frac{p}{c_o} m(t)$$

where $p$ is the excess pressure over the surface of the source. Since the downstream source operates in such a way that the excess pressure due to the plane wave mode is always zero, it does not absorb any energy — it acts as a simple reflector. It is the upsteam source — operating in a non-zero pressure field — that absorbs the incident energy. But it does not absorb it immediately — some of the energy gets past, to be reflected back by the second source and absorbed later in the cycle.

It should be noted that the presence of the non-propagating transverse modes does modify the rate of working of each source, but the total rate of working against the transverse modes can easily be shown to be zero. This means that in practice the downstream source may require energy to drive it, but this will be matched by an equivalent increase in the energy absorbed by the upstream source.

It remains to devise a system which will operate the sources to satisfy the equations. In some application, where the source initially generating the unwanted sound has a fixed frequency or frequencies it may be possible to drive the control sources by a suitable synchronising signal from the generating source, but in more general applications it will be necessary to detect the incoming radiation.

Figure 7:
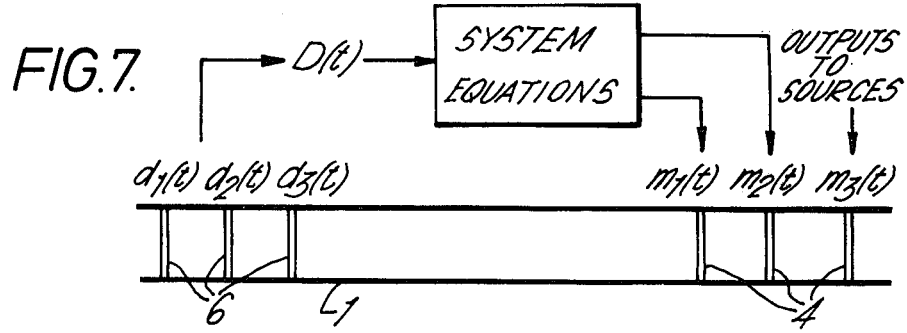
FIG. 7 is a diagram illustrating a feedback system for operating three longitudinally spaced sound sources.

The problem of detection is easy to overcome, since by using an array of detectors 6 as shown in FIG. 7 in exactly the same way as the sources 4 were coupled together plane waves travelling downstream can be detected while waves travelling upstream are rejected. This should prevent any possibility of resonance or instability arising from interaction between the source output and the signal picked up by the detectors. If detectors of composite form similar to that of the ring sources are used, propagating transverse modes below $\omega_\mu(M)$ will not be detected.

For example take two detectors $d_1(t)$ and $d_2(t)$ separated by a distance $b$ and at
$x = -1, -1+b$ (say). If the output is taken as $$D(t) = d_1(t) - d_2(t - \gamma_{21})$$

this is zero for a wave travelling upstream, but the disturbance wave $f_o$ will yield an output $$f_o(t + \frac{1}{c_o(1+M)}) - f_o(t + \frac{1}{c_o(1+M)} - \gamma_o),$$

$$\gamma_o = \frac{2b}{c_o(1-M^2)}$$

Similarly if three detectors and three ring sources are used, the output from the detectors would be $$D(t) = f_o(t + \frac{1}{c_o(1+M)}) - \frac{1}{2}[f_o(t + \frac{1}{c_o(1+M)} - \gamma_1) + f_o(t + \frac{1}{c_o(1+M)} - \gamma_2)]$$

while the equation to be satisfied is $$m_2(t) - \frac{1}{2}[m_2(t - \gamma_1) + m_2(t - \gamma_2)] = -\frac{A}{c_o}(1+M)f_o(t - \frac{b}{c_o(1+M)})$$

By taking the Laplace Transform, the relation between $m_2(p)$ and $D(p)$ becomes:

$$m_2(p) = -\frac{A}{c_o}(1 + M)[\frac{1}{1 - \frac{1}{2}(e^{-p\gamma_1} + e^{-p\gamma_2})}]^2 e^{-p(\frac{1+b}{c_o(1+M)})} D(p)$$

This consists of a single time delay $$\frac{1+b}{c_o(1+M)}$$

and two circuits in series each with transfer function $$\frac{1+b}{c_o(1+M)}, [1 - \frac{1}{2}(e^{-p\gamma_1} + e^{-p\gamma_2})]^{-1}, \frac{4n\pi}{\gamma_1}, \omega = \frac{10\pi}{\gamma_1}$$

Now the latter is a simple feedback circuit involving two pure time delays, $\gamma_1$ and $\gamma_2$ as shown in FIG. 8, but in its present form it would exhibit D.C. instability, and moreover if $\gamma_1: \gamma_2 = 2:3$ there would be resonance at frequencies $$\frac{4n\pi}{\gamma_1}.$$

The D.C. instability may be removed by incorporating a high pass (D.C.) filter in the loop at 7, while if $\gamma_1: \gamma_2 = 2:2.8$ is chosen most of the desirable characteristics of the choice 2:3 are retained, but the first resonance now occurs at $$\omega = \frac{1_o}{\gamma_1}.$$

This is well outisde the useful frequency range and it should be possible to overcome this by using a low pass filter.

The Nyquist Plot for such a feedback loop, with a D.C. filter $$\frac{.75 + 10 i\omega}{1 + 10 i\omega}, \omega = \frac{.6}{\gamma_1} \rightarrow \frac{12}{\gamma_1}$$

is shown in FIG. 9. The useful frequency range is approximately $$\omega \frac{.6}{\gamma_1} \rightarrow \frac{12}{\gamma_1}$$

or X20.

Now the gain margin is not very great and to attempt to drive the system at frequencies outside the range given above would produce excessively large output amplitudes. Thus it will be necessary to filter the output from the detectors to remove frequencies outside this range.

Consider the inclusion of such a filter $F(\omega)$ in the circuit. Providing the system equations are accurately represented over the passband of $F(i\omega)$ the final output downstream is $$[1 - F(i\omega)]f_o(i\omega).$$

Now a conventional filter would tend to have rapid phase changes occurring at the ends of the pass-band and this could lead to a local amplification of the output. But if the cut-off of the filter is sufficiently sharp this effect will be confined to a very narrow frequency band and should be more than compensated for by the reduction in intensity in the main pass-band.

But it should be noted that since it is necessary to introduce a time delay $$\frac{1+b}{c_o(1+M)}$$

between signal detection and operation of the sources a time lead has effectively been gained and this shouuld enable the design of filters with much better gain/phase characteristics than is usually the case. Also this lead can be used to compensate for any undesirable characteristics in the frequency response of the detectors or sources. The latter point is very important — the main system is open loop and preservation of the phase of the detected signal is important if accurate attenuation is to be obtained.

In practice some form of downstream monitoring of the final output would probably be included. For frequencies well below the cut-off $\omega_c$ the phase lags involved in downstream detection would be very small and the transverse modes will have decayed exponentially in a distance of about one pipe diameter, so one could mount detectors this distance downstream and get accurate monitoring of the residual field. For higher frequencies this will not be possible, but some form of optimisation process could be used to vary certan parameters of the system and get maximum reduction in intensity.

The techniques described may be extended to the control of a finite number of higher transverse modes, thus enabling the upper frequency limits to be raised.

It is easy to show that for uniform flow in a duct the problems of detecting and generating a given mode are complementary — this is a direct consequence of Green's Reciprocal Theorem. So it is only necessary to consider the problem of generating a given mode, and the problem of detecting the same mode will be automatically satisfied if one chooses the same array of detectors as sources.

When considering transverse modes below a prescribed cut-off frequency $\omega p$ these take the form of a finite number of propagating modes with different angular dependence with respect to the axis of the duct. Corresponding to each of these types of angular dependence there is a prescribed number of radially dependent modes. For a duct of circular cross-section, the modes as a whole can be characterized mathematically by the expression $$J_n(\lambda_{nm}r)^{\cos}_{\sin}n\theta \, e^{i(\omega o^t \pm K_{nm}^{10_2})}$$

where
- $J_n$ is the Besset function of order $n$
- $r$ is the radial dependence
- $\theta$ is the angular dependence, $k_{nm}$ the appropriate mode wave number
- $n$ and $m$ are integers such that $$n \leq N(\omega_p)$$

$$m \leq M_n(\omega_p)$$

and the $m^{th}$ zero of the first derivative of $J_n$ is $$\frac{R}{c_o} \lambda_{nm}$$

where $R$ is the duct radius and $c_o$ is the velocity of sound. If one takes a ring source comprising $N + 1$, point sources uniformly distributed around the duct wall, each with amplitude cos $n_oO$ and driven in phase one will only generate the modes $$J_{n_o}(\lambda_{n_om}r) \cos n_o\theta$$

and non-propagating modes with dependence cos $p\theta$, $p > N$. If moreover one takes $2M_{n_o}$ such ring sources, it should be possible in general to satisfy the appropriate $2M_{n_o}$ equations giving zero output upstream, and downstream outputs of the desired amplitude for each of the modes $J_{n_o}(\lambda_{n_o m}r) \cos n_o\theta$.

One could simultaneously drive the same set of sources with an amplitude cos $n_{o'\theta}$ and thus generate the set of modes $$J_{n_o'0}(\lambda_{n_o'm}r) \cos n_o'\theta$$

So in order to generate modes of different $\theta$-dependence it is not necessary to use different ring sources, one can use the same set of ring sources and superpose the different $\theta$-dependent inputs. Hence one should be able to obtain control of all the propagating modes for freuqencies below $\omega p$ by using a total number of ring sources equal to twice the highest value that $M_n(\omega_p)$ has for any value of $n$ not greater than $N(\omega_p)$. However there will be frequencies for which the output of the array will be zero for any given mode, just as was found in the case of two source rings in the plane wave problem. So it will be necessary, in practice to include some extra rings to cover these "dead" spots.

In conclusion it should be emphasized that the principal advantage which such a system would have over conventional passive methods of control is the short distance required to attenuate the sound field. For narrow band noise (2octaves), a 2-source/2-detector system could be used and for low frequencies the detectors need not be placed much more than one pipe diameter upstream of the sources. So the overall length required to detect and absorb the field need not be much more than $(1 - M) \times \frac{1}{2}$ wavelength.

Two practical embodiments of the present invention are shown in FIGS. 10 and 11 of the accompanying drawings.

Both these embodiments relate to the reduction of noise in aircraft jet engines which is a subject of considerable importance.

FIG. 10 shows diagrammatically a typical by pass jet engine. Noise from such an engine arises both forward from the compressor and aft from the combustion chambers and turbine. Thus at an inlet 10 of the engine is located an array of three sound sources 11, 11a, 11b, each consisting of three loudspeakers, spaced equally around the circular cross-section of the air inlet. A similar array of sound detectors 12, 12a, 12b, each consisting of microphones arranged similarly to the loudspeakers, is located adjacent the compressor 13 of the engine.

The longitudinal arrangement of the source and detector arrays is in accordance with the calculations regarding the attenuation of transversely propagated waves discussed previously in the specification. This is because the noise field generated in the front end of a jet engine is propagated in waves which are predominantly of this kind. The outputs of the detectors 12, 12a, 12b are amplified, suitably delayed and used to drive the sources 11, 11a 11b. The noise arising from the rear end of the engine contains a substantially higher proportion of longitudinally propagated sound waves. Thus at the rear of the engine is arranged an array of three sound sources 14, 14a, 14b each consisting of three loudspeakers spaced equally around the circular cross-section of the engine outlet. A similar array of sound detectors 15, 15a, 15b is located upstream of the source array and consists of microphones arranged in the same configuration as the loudspeakers of the source array. As with the front end of the engine, the outputs of the detectors 15, 15a, 15b are amplified, suitably delayed and used to drive the sources 14, 14a, 14b. Naturally the need for noise reduction is of greatest importance during take-off and landing and the device need not be employed during normal flying.

The embodiment shown in FIG. 11 is concerned with attenuating the low frequency content of jet exhaust noise during ground testing. This noise can be particularly objectionable to nearby residents as it probably will be of much greater duration than that which occurs during landing and take-off of jet aircraft.

In the embodiment of FIG. 11 jet engine 21 has attached to it a detuner 22 of well known design. Such detuners are extremely inefficient in removing the low frequency content of jet engine exhaust noise. The detuner 22 is rectangular in cross-section and has mounted on it an array of three sound detectors 23, 23', 23" each detector consisting of four microphones symmetrically positioned around the walls of the duct in a manner similar to that shown in cross-section diagram in FIG. 3b. A similar array of sound sources, 24', 24" constituted by loudspeakers arranged in the same configuration as the microphones of the detector array is mounted downstream of the detector array and is driven therefrom by means of suitable amplifying and delay circuitry hown at 25 to interfere destructively with the sound field longitudinally down the tuner 22.

I claim:
1. A method of attenuating a sound wave propagating in a given direction along a duct through a fluid contained in the duct, the method comprising:
generating sound waves from an array of similar sound sources located adjacent the wall of said duct respectively at different positions along said duct, each source generating a pair of sound waves which travel through said fluid in opposite directions along said duct from the position of that source; and
controlling the operation of said array of sources to cause destructive interference to occur between the wave to be attenuated and the resultant of the waves generated by said sources and travelling in said given direction and simultaneously to cause the resultant of the waves generated by said sources and travelling in the direction opposite to said given direction to be negligible.

2. A method according to claim 1, in which the operation of said array of sources is controlled in response to the detection of sound waves propagated along said duct through said fluid in said given direction.

3. A method according to claim 2, in which said detection is effected by a sound detection system comprising an array of similar sound detectors located adjacent the wall of said duct respectively at different positions along said duct all of which positions are displaced from said array of sources in the direction opposite to said given direction.

4. A method according to claim 1, in which each of said sources comprises at least three discrete sound generating devices distributed symmetrically about the wall of said duct.

5. A method according to claim 1, in which the wave to be attenuated and the waves generated by said sources are all plane waves.

6. An apparatus for use in attenuating sound waves propagating along a duct through a fluid contained in the duct, the apparatus comprising:
an array of similar sound sources located adjacent the wall of said duct respectively at different positions along said duct, each source being capable of generating a pair of sound waves which travel through said fluid in opposite directions along said duct from the position of that source; and
means for operating said array of sources to cause destructive interference to occur between the wave to be attenuated and the resultant of the waves generated by said sources and travelling in said given direction and simultaneously to cause the resultant of the waves generated by said sources and travelling in the direction opposite to said given direction to be negligible.

7. An apparatus according to claim 6, in which said means for operating said array of sources comprises means for detecting sound waves propagated along said duct through said fluid in said given direction, and means for utilizing the output of said detecting means to control the operation of said array of sources.

8. An apparatus according to claim 7, in which said detecting means comprises an array of similar sound detectors located adjacent the wall of said duct respectively at different positions along said duct all of which positions are displaced from said array of sources in the direction opposite to said given direction.

9. An apparatus according to claim 6, in which each of said sources comprises at least three discrete sound generating devices distributed symmetrically about the wall of said duct.

10. An apparatus according to claim 6, in which said sources are operative to generate plane waves.

* * * * *

UNITED STATES PATENT AND TRADEMARK OFFICE
CERTIFICATE OF CORRECTION

PATENT NO. : 4,044,203
DATED : August 23, 1977
INVENTOR(S) : Malcolm Alexander SWINBANKS It is certified that error appears in the above-identified patent and that said Letters Patent are hereby corrected as shown below:

Item [63], "Nov. 28, 1973" should read --Nov. 20, 1973--.

Sheet 3 of the drawings, Fig. 10, the second "13" on the right should be deleted.

Column 1, line 17, "file" should read --title--.

Column 2, line 41, "fed" should read --led--.

Column 3, line 36, "circumferential" should be deleted;

line 41, "of" (first occurrence) should read --or--;

line 43, "$\omega_{82}(M)$" should read --$\omega_{\mu}(M)$--.

Column 4, line 9, "P(x,t)" should be --p(x,t)--;

line 27, "$\omega_{82}(M)$" should read --$\omega_{\mu}(M)$--;

line 36, in both subscripts, "u" should be --$\mu$--.

UNITED STATES PATENT AND TRADEMARK OFFICE
CERTIFICATE OF CORRECTION

PATENT NO. : 4,044,203
DATED : August 23, 1977
INVENTOR(S) : Malcolm Alexander SWINBANKS It is certified that error appears in the above-identified patent and that said Letters Patent are hereby corrected as shown below:

Column 5, line 48, "$m_3(m_3(t)$", should read --$m_3(t)$--;

line 61, "he" should read --the--.

Column 6, line 6, "$m_2$the" should read --$m_2$ the--;

line 14, this line should read

--$|1-1/2(e^{-i\omega\dot{\gamma}_1}+e^{-i\omega\dot{\gamma}_2})|$--.

Column 7, line 15, --ring-- should be inserted before "sources";

line 31, correct the spelling of "confined";

line 52, correct "thw" to --the--.

Column 9, line 30, this line should read

--$[1-1/2(e^{-p\gamma_1}+e^{-p\gamma_2}]^{-1}$--;

line 51, "outisde" should read --$\overline{\text{outside}}$--;

line 57, this line should read -- $\dfrac{.75 + 10\dot{i}\omega}{1 + 10\dot{i}\omega}$ --;

UNITED STATES PATENT AND TRADEMARK OFFICE
CERTIFICATE OF CORRECTION

PATENT NO. : 4,044,203
DATED : August 23, 1977
INVENTOR(S) : Malcolm Alexander SWINBANKS It is certified that error appears in the above-identified patent and that said Letters Patent are hereby corrected as shown below:

Column 9, line 64, this line should read $$--\omega = \frac{.6}{\gamma_1} \rightarrow \frac{12}{\gamma_1} --.$$

Column 10, line 4, "F($\omega$)" should read $--F(i\omega)--$;

line 43, "certan" should read --certain--;

line 67, this line should read $$--J_n(\lambda_{nm}r)\genfrac{}{}{0pt}{}{\cos}{\sin}n\theta \, e^{i(\omega_o t \pm k_{nm}x)} --.$$

Column 11, line 2, "Besset" should read --Bessel--;

line 17, the comma at the end of the line should be deleted;

line 19, "$\cos n_o O$" should read $--\cos n_o \theta --$;

line 28, "$J_{n_o}(\lambda_{n_o}mr)\cos n_o\theta$" should read $$--J_{n_o}(\lambda_{n_o m}r)\cos n_o\theta--;$$

line 30, "$\cos n_{o'}\theta$" should read $--\cos n'_o\theta--$;

UNITED STATES PATENT AND TRADEMARK OFFICE
CERTIFICATE OF CORRECTION

PATENT NO. : 4,044,203
DATED : August 23, 1977
INVENTOR(S) : Malcolm Alexander SWINBANKS It is certified that error appears in the above-identified patent and that said Letters Patent are hereby corrected as shown below:

Column 11, line 32, this line should read $$--J_{n_o'}(\lambda_{n_o'm}r)\cos n_o'\theta--;$$

line 39, "ωpby" should read --ωp by--;

line 41, "nnot" should read --$\underline{n}$ not--;

line 51, "(2octaves)" should read --(2 octaves)--.

Column 12, line 45, -- the -- should be inserted before "cross-section";

line 46, -- 24 -- should be inserted after "sources";

line 51, "hown" should read -- shown --;

line 52, -- propagated -- should be inserted after "field".

Signed and Sealed this

Fifth Day of June 1979

[SEAL]

Attest:

RUTH C. MASON
*Attesting Officer*

DONALD W. BANNER
*Commissioner of Patents and Trademarks*